Figure 1:
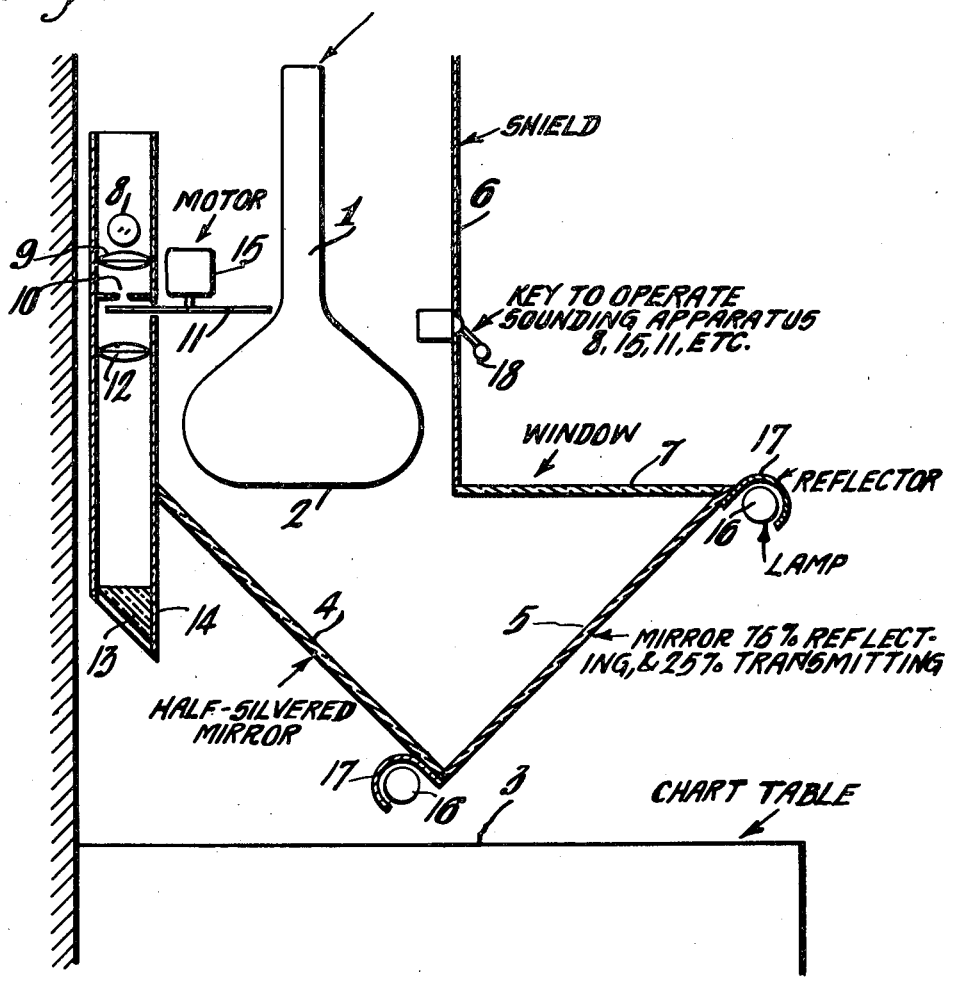

May 24, 1949.   F. P. BEST ET AL   2,470,912
NAVIGATION AIDING APPARATUS
Filed Nov. 28, 1947

INVENTORS
FRANK POWELL BEST
CHRISTOPHER DERING COLCHESTER
& JAMES TWATT

BY J. L. Whittaker
ATTORNEY

Patented May 24, 1949

2,470,912

UNITED STATES PATENT OFFICE 2,470,912

NAVIGATION AIDING APPARATUS

Frank Powell Best, Chelmsford, Christopher Dering Colchester, Danbury, and James Twatt, Chelmsford, England, assignors to Radio Corporation of America, a corporation of Delaware Application November 28, 1947, Serial No. 788,700
In Great Britain April 5, 1946

4 Claims. (Cl. 177—386)

This invention relates to navigation aiding apparatus and has for its object to provide an improved apparatus whereby full navigational information may be given to a navigator or other ship's officer by means of a single display in a convenient and quickly recognizable form.

It is well known to assist ship navigation by means of a radar installation providing a so-called P. P. I. display of the area round a ship, and it has been proposed optically to superimpose such a display upon the appropriate chart. Such an arrangement gives the ship's officer a good deal of navigational information in a convenient form, but of course, it gives no information with regard to soundings. The P. P. I. type of radar display is described in Principles of Radar by the M. I. T. Radar School, Chapter I, pages 1-11 and 1-12. It is to be understood that the term "P. P. I. radar display" is intended to cover equivalents such as a sector scan in place of a full 360 degree scan, the important feature being that both angular position and distance are displayed on one view.

According to this invention a navigation aiding display apparatus for use on ship-board comprises a cathode ray tube giving a P. P. I. radar display, means for enabling the screen of said tube to be viewed optically superimposed upon the appropriate chart, and means for providing also optically superimposed upon said chart an indication of the depth of water under the ship, said last-mentioned means being actuated by an echo sounder and being arranged to give a sounding indication on the ship's position on the chart. Preferably the means for superimposing the echo sounding indication is normally inoperative and operable at will by a key switch or the like though, if desired, the indication may be made continuous.

In some forms of P. P. I. radar display for shipboard use there is provided a manually operable key or the like which, when actuated causes the normal central spot representing the ship's position on the P. P. I. presentation to be expanded to a small ring of about an inch diameter. In applying the present invention to an installation of this nature the echo sounding indication is preferably arranged to be presented automatically upon pressing this key and to appear in the center of the ring.

The clear central spot in the P. P. I. picture may be produced by use of a suitable gating pulse or by use of a receiver blocking pulse of sufficient width to last for a short period following the termination of the transmitted pulse. The gating or blocking pulse may be present at all times or it may be applied only when the manually operable key is actuated. A suitable gating circuit is described in Patent No. 2,455,673, filed January 19, 1942, and issued December 7, 1948, to C. W. Hansell. In using gating means such as shown by Hansell, it will be understood that the gating pulse is made wide enough to include the desired range and its starting time is made to correspond to the outer edge of the clear central spot. Suitable means for clearing the center of the P. P. I. picture are also described in Principles of Radar by the M. I. T. Radar School, Chapter II, pages 2-2 and 2-3 under "Gate pulses."

The use of sensitivity time control (STC) or cyclic AVC mentioned in the cited paragraph in Principles of Radar may also be employed. The STC voltage may be applied to the receiver at all times or may be applied only when the manually operable switch is activated. An example of a cyclic AVC is described in patent application Serial No. 267,475, filed April 12, 1939, in the name of Rogers M. Smith.

Figure 2:
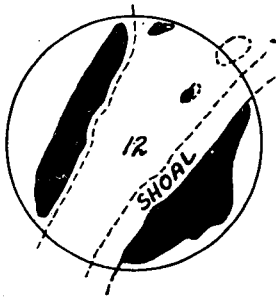

The invention is illustrated in the accompanying drawing in which Figure 1 shows diagrammatically one embodiment thereof and Figure 2 shows, by way of example, a view that may be seen at the window 7.

Referring to the drawing a P. P. I. display radar tube 1 is mounted above the chart table 3 with its screen 2 facing downwards and parallel to said table. Beneath the tube at an angle of 45° to the surface of the chart table is a half-silvered mirror 4 at right angles to which is a second mirror 5 which may be 75 percent reflecting and 25 percent light transmitting. The cathode ray tube is behind a shield 6 so that it cannot be directly seen and a chart on the table is viewed by looking vertically downwards in the direction of the arrow through a plain glass window 7 and the three-quarter reflecting mirror 5. With this arrangement if the mirrors 4 and 5 are suitably dimensioned in accordance with well known optical laws the P. P. I. display may be seen superimposed upon the chart on the chart table by the principle of the "Pepper's ghost" illusion. The illusion known as "Pepper's ghost" is described on page 23 of A Treatise on Light by R. A. Houston, sixth edition, published by Longmans, Green and Co. Behind the cathode ray tube are arranged, one below the other in the order stated, a lamp 8, an optical condenser lens system 9, an apertured member 10, the edge of a rotatable disc 11 of glass or other transparent material marked with figures of soundings (usually in fathoms), an objective lens system 12 and a prism 13 or mirror. The prism 13 or mirror is positioned to direct light through a ground glass screen 14 to a point on the back of the half-silvered mirror 4 corresponding to the middle of the cathode ray tube screen. Strip lights and associated reflectors are shown at 16 and 17. The whole arrangement is such that when the lamp 8 is switched on an image of that sounding figure on disc 11 which is at the moment opposite the aperture in member 10 will be projected through the half-silvered mirror 4 and will accordingly appear as part of the total presentation which is viewed by the principle of "Pepper's ghost." The glass or other transparent disc 11 is rotated by a motor 15 and a contact (not shown) on the disc is arranged in any convenient known way to initiate an echo sounding transmitted pulse when the zero indicating figure on the disc is opposite the aperture in member 10. The echo sounding receiver output is utilized in known manner to control the lamp 8 so as to flash it when a sounding echo is received and the speed of rotation of the disc 11 is so determined in accordance with the velocity of propagation of sound in water that the sounding figure opposite the aperture when the lamp is flashed is that giving the sounding taken.

Figure 2 shows an example of a complete combined view as seen at the window 7. The solid black areas represent the P. P. I. view, the dotted lines and the legend "Shoal" represent the chart, and the numeral 12 represents the sounding figure.

In order not to confuse the radar presentation it is preferred for the sounding apparatus and sounding display means to be normally inoperative, but to be arranged so that it can be brought into operation when desired by pressing a spring loaded key. Such a key is indicated at 18. It is unnecessary to indicate the key circuits but it may conveniently be the key normally provided for expanding the central spot corresponding to ship's position on the cathode ray tube screen into a ring. It will be seen that if this expedient be adopted, when the spring loaded key is pressed, the appropriate sounding figure as taken by the echo sounder will appear in the middle of the ring at the position on the chart corresponding to the ship's position, so that the navigator will see against the background of the chart both the P. P. I. display and the sounding.

We claim as our invention:

1. An apparatus comprising in combination a P. P. I. radar display tube, a chart table, a light-reflecting light-transmitting mirror system for enabling a chart on said table and the P. P. I. pattern produced by said tube to be viewed simultaneously in correct superimposition by the principle of the "Pepper's ghost" illusion, an echo sounder, a light source arranged to be energized on receipt of an echo signal by said sounder, a sounding scale member having sounding indications so arranged and driven as to be interposed in turn in the light path from said source, means for transmitting a sounding pulse when the zero of the sounding scale member is interposed in the light path, an optical system for superimposing on the chart and display presentation, in the position corresponding to ship's position thereon, an image of the indication in the light path when the light source is energized.

2. In combination, a cathode ray tube having a screen on which a view appears, a chart table or support on which a chart may be placed, a mirror system comprising two partially-silvered mirrors for causing said view and said chart to appear in superimposed relation due to the principle of the "Pepper's ghost" illusion, one of said mirrors being positioned opposite said tube screen and the other of said mirrors being positioned opposite said chart support, a device having additional graphical information thereon, and means for causing said additional information to appear superimposed on said view and said chart, said last means comprising means for directing light rays representative of said additional information through said partially-silvered mirror that is opposite the tube screen to the other partially-silvered mirror which reflects said light toward the observer.

3. In combination, a cathode ray tube having a screen on which a view appears, a chart table or support on which a chart may be placed, a mirror system comprising two partially-silvered mirrors for causing said view and said chart to appear in superimposed relation due to the principle of the "Pepper's ghost" illusion, one of said mirrors being positioned opposite said tube screen and the other of said mirrors being positioned opposite said chart support, a device comprising a rotatable disc having additional graphical information thereon, and means for causing said additional information to appear superimposed on said view and said chart, said last means comprising means for directing light rays representative of said additional information through said partially-silvered mirror that is opposite the tube screen to the other partially-silvered mirror which reflects said light toward the observer.

4. In combination, a cathode ray tube having a screen on which a view appears, a chart table or support on which a chart may be placed, a window opposite said chart support, a mirror system comprising two partially-silvered mirrors for causing said view and said chart to appear in superimposed relation as viewed through said window due to the principle of the "Pepper's ghost" illusion, one of said mirrors being positioned opposite said tube screen and the other of said mirrors being positioned opposite said chart support and substantially at right angles to said one mirror, a device having additional graphical information thereon, and means for causing said additional information to appear superimposed on said view and said chart, said last means comprising means for directing light rays representative of said additional information through said partially-silvered mirror that is opposite the tube screen to the other partially-silvered mirror which reflects said light through said window toward the observer.

FRANK POWELL BEST.
CHRISTOPHER DERING COLCHESTER.
JAMES TWATT.

REFERENCES CITED

The following references are of record in the file of this patent:

UNITED STATES PATENTS

| Number | Name | Date |
| --- | --- | --- |
| 1,729,595 | Hayes | Sept. 24, 1929 |
| 2,183,634 | Zworykin | Dec. 19, 1939 |
| 2,407,467 | Barry | Sept. 10, 1946 |
| 2,410,667 | Luboshez | Nov. 5, 1946 |

FOREIGN PATENTS

| Number | Country | Date |
| --- | --- | --- |
| 473,024 | Great Britain | Oct. 4, 1937 |
| 856,256 | France | Mar. 18, 1940 |